United States Patent Office 3,531,491
Patented Sept. 29, 1970

3,531,491
CERTAIN 6-HEXANOYL OR 6-(1-HYDROXYHEXYL)BICYCLO[2.2.1]HEPT - 2 - ENE - 5 - CARBOXYLIC ACIDS, ESTERS THEREOF AND 5-YLKETONES
Masateru Miyano, Morton Grove, Ill., assignor to G. D. Searle & Co., Chicago, Ill., a corporation of Delaware
No Drawing. Filed Dec. 8, 1967, Ser. No. 688,981
Int. Cl. C07d 31/32
U.S. Cl. 260—297                7 Claims

ABSTRACT OF THE DISCLOSURE 5,6 - disubstituted bicyclo[2.2.1]hept - 2 - enes useful as anti-inflammatory, pepsin-inhibitory, anti-ulcerogenic, anti-bacterial, anti-fungal, anti-protozoal, anti-algal and dicotyledonous seed germination-inhibitory agents and preparable by modification of the carboxyl and hexanoyl functions of trans - 6 - hexanoylbicyclo[2.2.1]hept-2-en-5-oic acid.

---

The present invention is concerned with novel chemical compounds containing the bicyclo[2.2.1]heptane ring structure, a 2,3-double bond and functional substituents at the 5 and 6 positions. More particularly, these compounds are those represented by the following structural formula

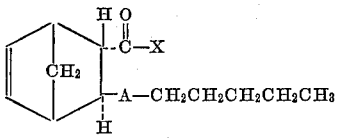

wherein A can be a carbonyl or hydroxymethylene radical, X is a hydroxy or lower alkoxy radical when A is hydroxymethylene and X is a (lower alkanoyl)oxymethyl radical or radical of the formula

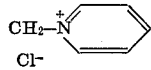

or

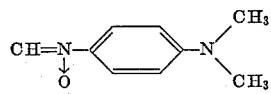

when A is carbonyl.

The lower alkoxy radicals encompassed by the X term are exemplified by methoxy, ethoxy, propoxy, butoxy, pentyloxy, hexyloxy, heptyloxy and the branched-chain groups isomeric therewith.

Typical of the lower alkanoly radicals embraced by the X term are formyl, acetyl, propionyl, butyryl, valeryl, caproyl, heptanoyl, and the branched-chain isomers thereof.

A convenient method for manufacture of the compounds of the present invention involves the use of trans- 6 - hexanoylbicyclo[2.2.1]hept - 2 - en-5-oic acid as the starting material. Reduction of the carbonyl function with a suitable metallic reducing agent such as sodium borohydride affords 6 - (1 - hydroxyhexyl)bicyclo[2.2.1]hept-2-en-5-oic acid, which can be esterified with a diazoalkane to yield the corresponding alkyl esters. Reaction of that acid with diazomethane in ethyl acetate at room temperature thus affords methyl 6 - (1 - hydroxyhexyl)bicyclo [2.2.1]hept-2-en-5-oate.

The more complex 5-substituted instant derivatives are produced by conversion of the aforementioned 6 - hexanoylbicyclo[2.2.1]hept - 2 - en - 5-oic acid to the corresponding acid chloride, reaction of the latter substance with diazomethane to produce the diazoketone and reaction of that compound with hydrogen chloride, thus yielding 6 - hexanoylbicyclo[2.2.1]hept - 2 - en-5-yl chloromethyl ketone. When that substance is contacted with the alkali metal salt of a lower alkanoic acid, the chlorine atom is replaced by a lower alkanoyloxy group. Heating with potassium acetate in ethanol thus affords 6-hexanoylbicyclo[2.2.1]hept - 2 - en - 5-yl acetoxymethyl ketone. Reaction with a tertiary amine affords the corresponding quaternary salt. When the tertiary amine is pyridine, the product obtained is 5 - pyridiniummethylcarbonyl - 6-hexanoylbicyclo[2.2.1]hept - 2 - ene chloride. The reaction of that substance with an aromatic nitroso compound affords the instant amine oxides. That pyridinium chloride is thus contacted with p - nitroso - N,N - dimethylaniline and aqueous sodium hydroxide in ethanol to yield trans - p - dimethylamino - N-(6-hexanoylbicyclo [2.2.1]hept - 2 - ene - 5-carbonylmethylene) aniline N-oxide.

The compounds of the present invention are useful as pharmacological agents themselves and also as intermediates to other pharmacologically useful compounds. The latter group of substances is defined by the structural formula

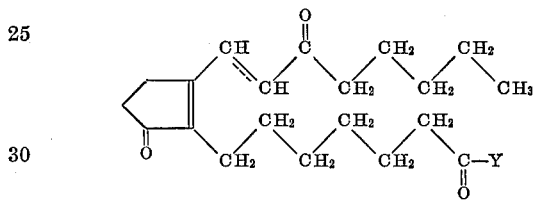

wherein the dotted line indicates that the linkage between carbon atoms 13 and 14 is a single bond or a double bond, Y is a lower alkoxy group when said linkage is a double bond and Y is a hydroxy or lower alkoxy group when said linkage is a single bond, and are produced by the reaction of 6 - hexanoylbicyclo[2.2.1]hept - 2 - ene-5 - yl chloromethyl ketone with dimethyl 3 - oxoundecane-1,11-dioate, hydrolysis and decarboxylation of the resulting adduct, esterification of the resulting carboxylic acid with a diazo (lower alkane) and pyrolysis of that ester to afford a lower alkyl 9,15 - dioxaprosta-8(12),13-dienoate. When the diazo (lower alkane) is diazomethane, for example, methyl 9,15 - dioxoprosta - 8(12),13-dienoate is produced. Reaction of the latter substances with zinc and acetic acid results in reduction of the 13, 14 double bond while saponification affords the corresponding carboxylic acid. These compounds are useful as anti-protozoal agents as is evidenced by their ability to inhibit the growth of such organisms as *Tetrahymena gelleii*. The assay used is described as follows:

A sterile nutrient medium of the following composition:

Proteose peptone—12 g.
Sucrose—8 g.
Distilled water—1000 ml.

is inoculated with a viable axenic culture of *Tetrahymena gelleii*, then is incubated at about 25° C. for 24 hours. At the end of that time, 0.5 ml. quantities are transferred aseptically to test tubes containing approximately 5 mg. of the test compound. The test tubes containing the culture alone serve as controls. At the end of a second 24 hour incubation period, the tubes are examined microscopically in order to determine the degree of growth of the test organism. A compound causing a definite inhibition of growth of the organism as compared to the controls is considered active.

In the latter assay, methyl 9,15-dioxoprosta-8(12),13-dienoate produced a definite inhibition of the growth of *Tetrahymena gelleii* as compared to the controls.

As stated hereinbefore, the instant compounds themselves display useful pharmacological activity. They are for example, anti-inflammatory, anti-ulcerogenic and pepsin-inhibitory agents. They exhibit anti-microbial activity also as evidenced by their anti-bacterial, anti-fungal, anti-protozoal and anti-algal activity, in particular against such microorganisms as *Diplococcus pneumoniae, Trichophyton mentagrophytes, Tetrahymena gelleii* and *Chlorella vulgaris*. In addition, they are inhibitors of dicotyledonous seed germination.

These substances can be administered in any of a number of conventional pharmaceutical forms and also by conventional routes. For oral administration suitable solid forms are pills, powders, capsules, tablets, and the like and suitable liquid forms are syrups, emulsions, elixirs, suspensions and the like. For parenteral administration these compounds can be dispersed in an aqueous suspension or dissolved in a pharmacologically acceptable oil or oil-water emulsion. Suitable excipients can also be added.

The pharmacological activity of the novel compounds of this invention is specifically illustrated by the anti-inflammatory activity of trans-6 - hexanoylbicyclo[2.2.1]hept-2-en-5-yl acetoxymethyl ketone, transmethyl 6-(1-hydroxyhexyl)bicyclo[2.2.1]hept-2-en-5-oate and trans - 5-pyridiiummethylcarbonyl-6 - hexanoylbicyclo[2.2.1]hept-2-ene chloride when administered subcutaneously to rats at a dose of 25 mg. The following assay for determination of anti-inflammatory activity was used:

Each of a group of 10 intact male rats weighing 100–130 g. is injected, under the plantar surface of each hind foot, with 0.1 ml. of a 1% solution of carrageenin (Type 402, Marine Colloids Inc.). The test compound, dissolved or suspended in saline, corn oil or propylene glycol is administered subcutaneously 1 hour prior to the carrageenin injection. Another such group serving as controls is treated in the identical manner save for omission of the test compound. The edema resulting from carrageenin injection is determined by measuring the circumference of the hind feet, in arbitrary units, 5 hours after the carrageenin injection and subtracting the average swelling of the group treated with the test compound from the average swelling of the control group. Compounds are rated active if they produce a significant decrease ($P<0.05$) in the swelling observed in control animals. In this assay, the aforementioned trans-6-hexanoylbicyclo[2.2.1]hept-2-en-5-yl acetoxymethyl ketone, trans-methyl 6-(1-hydroxyhexyl)bicyclo[2.2.1]hept-2-en-5-oate and trans - 5 - pyridiniummethylcarbonyl-6-hexanoylbicyclo[2.2.1]hept-2-ene chloride were observed to produce a significant decrease in swelling.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples temperatures are given in degrees centigrade (° C.). Quantities are expressed in parts by weight unless otherwise noted.

EXAMPLE 1

To a solution of 27 parts of trans-6-hexanoylbicyclo[2.2.1]hept-2-en-5-oic acid in 88 parts of benzene is added 30 parts of oxalyl chloride. The resulting reaction mixture is heated at the reflux temperature for about 10 minutes, then is concentrated to dryness under reduced pressure to afford trans-6-hexanoylbicyclo[2.2.1]hept-2-en-5-oyl chloride. That residue is dissolved in benzene and added to 1000 parts by volume of an ethereal diazomethane solution which has been prepared by the reaction of 28 parts of nitrosomethylurea with excess aqueous potassium hydroxide in ether. After about two hours, the mixture containing 6-hexanoylbicyclo[2.2.1]hept-2-ene-5 - carbonyldiazomethane is saturated with dry hydrogen chloride and that mixture is allowed to stand at room temperature for about 90 minutes, then is washed successively with water, dilute aqueous sodium bicarbonate and water and dried over anhydrous sodium sulfate. The resulting residue is distilled at 0.2 mm. pressure and the fraction boiling at 146–147° is collected, thus affording trans-6-hexanoylbicyclo[2.2.1]hept-2-en-5-yl chloromethyl ketone. This compound is represented by the following structural formula

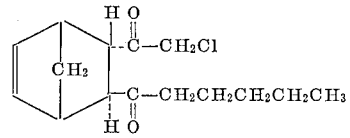

EXAMPLE 2

A mixture containing 11.8 parts of trans-6-hexanoylbicyclo[2.2.1]hept-2-en-5-yl chloromethyl ketone, 15 parts of potassium acetate and 80 parts of ethanol is heated at the reflux temperature for about two hours, then is concentrated under reduced pressure and diluted with water. That aqueous mixture is extracted with ether and the ether layer is separated, washed with water, dried over anhydrous sodium sulfate and stripped of solvent under reduced pressure. The resulting residue is fractionally distilled under reduced pressure to afford the crude product, boiling at 145–153° at 0.25–0.3 mm. pressure. That material is purified by redistillation at 0.3 mm. pressure to afford pure trans-6-hexanoylbicyclo[2.2.1]hept-2-en-5-yl acetoxymethyl ketone, boiling at 145–148°. It is represented by the following structural formula

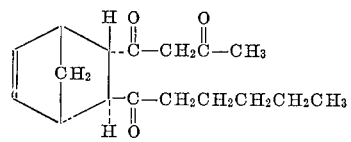

EXAMPLE 3

A suspension of 12 parts of trans-6-hexanoylbicyclo[2.2.1]hept-2-en-5-oic acid in 50 parts of water and 80 parts of methanol is neutralized by the addition of aqueous sodium hydroxide, then is cooled to 0–5° and 3 parts of sodium borohydride is added. That reaction mixture is stored at 0–5° for about 16 hours, then is allowed to warm to room temperature and stored for about 6 hours. Acidification of the mixture with hydrochloric acid followed by dilution with water affords an aqueous solution, which is cooled at 0–5° in order to induce crystallization of the product. The white leaflet-like crystals are collected by filtration, washed with water and dried to afford a mixture of the epimeric trans-6-(1-hydroxyhexyl)bicyclo[2.2.1]hept-2-en-5-oic acids melting at about 130–152°. That mixture is purified by recrystallization first from benzene then from ethyl acetate to afford trans-6-(1-hydroxyhexyl)bicyclo[2.2.1]hept-2-en-5-oic acid, melting at about 164–165°. It is represented by the following structural formula

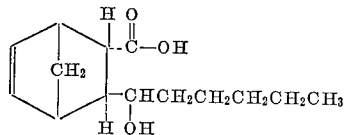

EXAMPLE 4

To a solution of 2.6 parts of trans-6-(1-hydroxyhexyl)bicyclo[2.2.1]hept-2-en-5-oic acid in 360 parts of ethyl acetate is added excess ethereal diazomethane and that mixture is allowed to stand at room temperature for about 5 minutes, then is concentrated to dryness under reduced pressure. The resulting residue is extracted into benzene and the benzene solution is stripped of solvent, then distilled at 0.3 mm. pressure to afford trans-methyl-6-(1-hydroxyhexyl)bicyclo[2.2.1]hept-2-en-5-oate, boiling at about 130–132°. This compound is illustrated by the following structural formula

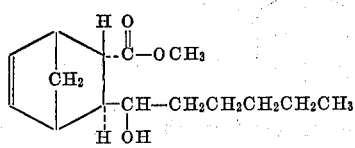

EXAMPLE 5

A solution of trans-6-hexanoylbicyclo[2.2.1]hept-2-en-5-yl chloromethyl ketone (prepared from 40 parts of trans-6-hexanoylbicyclo[2.2.1]hept-2-en-5-oic acid according to the procedure described in Example 1) in 100 parts of anhydrous pyridine is allowed to stand at room temperature for about 48 hours, at the end of which time the crystals which have formed are collected by filtration, washed with dioxane, then dissolved in ethanol. The resulting solution is filtered and the filtrate is diluted with dioxane. That solution is stored at 0–5° for about 1 hour, thus producing colorless leaflet-like crystals, which are isolated by filtration and washed with dioxane, then dried to afford 5-pyridiniummethylcarbonyl-6-hexanoylbicyclo-[2.2.1]hept-2-ene chloride, melting at about 186° with decomposition. This substance is illustrated by the following structural formula

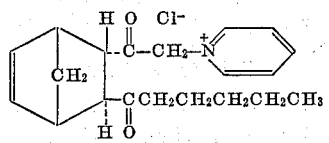

EXAMPLE 6

To a solution of 24.6 parts of trans-5-pyridiniummethylcarbonyl - 6-hexanoylbicyclo[2.2.1]hept-2-ene chloride in 40 parts of ethanol is added 10.6 parts of p-dimethylaminonitrosobenzene dissolved in 160 parts of ethanol. That reaction mixture is stirred at 0–5° while 70 parts by volume of 1 N aqueous sodium hydroxide is added. The initial greenish solution gradually turns reddish brown and after about 10 minutes crystallization commences. The mixture is then stored at 0–5° for about 16 hours and the light brown crystals are collected by filtration, washed on the filter with cold aqueous ethanol and dried to yield the crude product. That material is extracted with acetone and the extract is concentrated under nitrogen to afford a residue, which is purified by recrystallization from aqueous ethanol thus affording pure trans p - dimethylamino-N-(6-hexanoylbicyclo[2.2.1]hept-2-ene-5-carbonylmethylene) aniline N-oxide, melting at about 125°. It is represented by the following structural formula

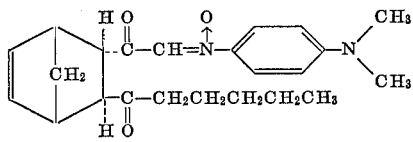

EXAMPLE 7

To a suspension of 8 parts of sodium metal in 352 parts of benzene is added portionwise 93 parts of dimethyl 3-oxoundecane-1,11-dioate. To the resulting clear solution is then added 48.7 parts of trans-6-hexanoylbicyclo[2.2.1] hept-2-en-5-yl chloromethyl ketone dissolved in 44 parts of benzene. The resulting mixture is stirred at room temperature for about 30 minutes, then is heated at the reflux temperature for about 3½ hours. The reaction mixture is cooled, then washed successively with cold hydrochloric acid and dilute aqueous sodium chloride, dried over anhydrous sodium sulfate and concentrated to dryness under reduced pressure. That residue is dissolved in 3800 parts by volume of 50% aqueous dioxane containing 127 parts of sodium hydroxide and the resulting solution is stirred in a nitrogen atmosphere for about 2 hours, allowed to stand at room temperature for about 16 hours, then stirred at about 65° for 3 hours, cooled and poured into a mixture of ice and 350 parts by volume of concentrated hydrochloride acid. Extraction of that aqueous acidic mixture with ether affords an organic solution, which is separated, washed with aqueous sodium chloride, then dried over anhydrous sodium sulfate and concentrated to dryness under reduced pressure. To a solution of that residue in 548 parts of quinoline is added 0.8 part of copper powder and the resulting reaction mixture is heated at 120–126° for about 5 hours in a nitrogen atmosphere, then is cooled and poured into a mixture of ice and hydrochloric acid. That aqueous mixture is extracted with ether and the ether solution is separated and washed with aqueous sodium chloride. An ethereal solution of diazomethane, prepared in the usual manner from 100 parts of nitrosomethylurea, is added and, after standing for about 5 minutes, the mixture is concentrated under reduced pressure to afford a dark oil. That oily material is fractionally distilled and the fractions boiling between 155° and 185° at 0.03–0.04 mm. pressure are collected. Those fractions which exhibit an ultraviolet absorption maximum at about 296 millimicrons are combined and purified by sausage chromatography on silica gel followed by elution with ethyl acetate-methanol solutions. In that manner there is obtained pure methyl 9,15-dioxoprosta-8(12),13-dienoate, which is characterized by an ultraviolet absorption maximum at about 296 millimicrons with a molecular extinction coefficient of 19,300–22,800. It is represented by the following structural formula

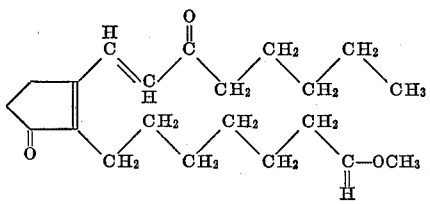

EXAMPLE 8

A mixture containing 1.1 parts of methyl 9,15-dioxoprosta-8(12),13-dienoate, 1.5 parts of zinc powder and 52.5 parts of acetic acid is stirred at room temperature for about 5 hours then is filtered in order to remove excess zinc. The filtrate is poured into cold aqueous potassium bicarbonate. That aqueous mixture is extracted with ether and the ether extract is dried over anhydrous sodium sulfate, then concentrated to dryness under reduced pressure. Purification of the resulting residue by chromatography on silica gel followed by elution with 25% ethyl acetate in benzene affords methyl 9,15-dioxoprost-8(12)-enoate as a pale yellow oil. It exhibits an ultraviolet absorption maximum at 238 millimicrons with a molecular extinction coefficient of about 13,400. In the infrared, a chloroform solution displays peaks at about 5.76–5.87 and 6.09 microns. This compound is represented by the following structural formula

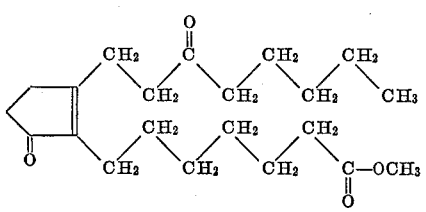

EXAMPLE 9

To a solution of 0.2 part of methyl 9,15-dioxoprost-8(12)-enoate in 8 parts of methanol is added 1 part by volume of 10% aqueous sodium hydroxide and that reaction mixture is allowed to stand at room temperature for about 20 hours, then is poured into 200 parts of water. That aqueous mixture is washed with ether, then is made acidic by the addition of hydrochloric acid and extracted with ether. The ether extract is separated, washed with 1% aqueous sodium chloride, dried over anhydrous sodium sulfate and concentrated under reduced pressure to afford an amber glass-like residue. Purification of that residue by chromatography on silica gel and elution with etheyl acetate affords 9,15-dioxoprost-8(12)-enoic acid as an amber glass, characterized by an ultraviolet absorption maximum of about 238 millimicrons with a molecular extinction coefficient of about 10,100 and also by the following structural formula

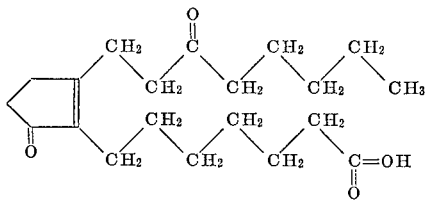

What is claimed is:

1. A compound of the formula

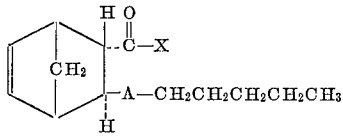

wherein A is selected from the group consisting of carbonyl and hydroxymethylene, X is a member of the class consisting of hydroxy and methoxy when A is hydroxymethylene and X is a member of the class consisting of acetoxymethyl and a radical of the formula when A is carbonyl.

2. As in claim 1, a compound of the formula

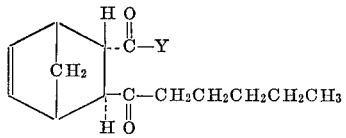

wherein Y is selected from the group consisting of acetoxymethyl and a radical of the formula.

3. As in claim 1, a compound of the formula

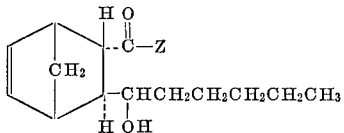

wherein Z is a member of the class consisting of hydroxy and methoxy radicals.

4. As in claim 1, the compound which is trans-6-hexanoylbicyclo[2.2.1]hept-2-en-5-yl acetoxymethyl ketone.

5. As in claim 1, the compound which is trans-methyl 6-(1-hydroxyhexyl)bicyclo[2.2.1]hept-2-en-5-oate.

6. As in claim 1, the compound which is trans-6-(1-hydroxyhexyl)bicyclo[2.2.1]hept-2-en-5-oic acid.

7. As in claim 1, the compound which is trans-5-pyridiniummethylcarbonyl - 6 - hexanoylbicyclo[2.2.1]hept-2-ene chloride.

References Cited
UNITED STATES PATENTS 3,312,675   4/1967   Caldwell et al.   260—80.5
3,355,462   11/1967   Colleuille et al.   260—343.3

JOHN D. RANDOLPH, Primary Examiner

A. L. ROTMAN, Assistant Examiner

U.S. Cl. X.R.

260—468, 488, 514, 566, 586; 424—263, 305, 331, 226

UNITED STATES PATENT OFFICE
CERTIFICATE OF CORRECTION

Patent No. 3,531,491                     Dated September 29, 1970

Inventor(s)  Masateru Miyano

It is certified that error appears in the above-identified patent and that said Letters Patent are hereby corrected as shown below:

Column 1, line 53, "alkanoly" should be -- alkanoyl --.

Column 3, line 25, "pyridiiummethylcarbonyl" should be -- pyridiniummethylcarbonyl --.

Column 4, second formula,

"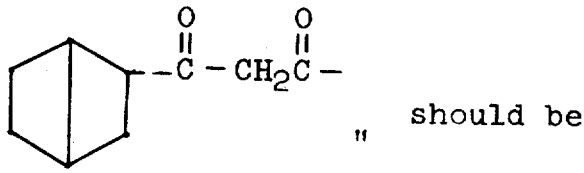"  should be

--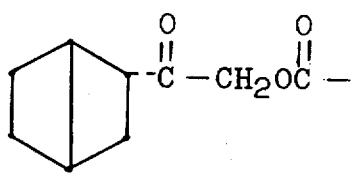--.

Column 6, line 5, "hydrochloride" should be -- hydrochloric --.

Column 7, line 11, "etheyl" should be -- ethyl --.

Column 7, first formula,

UNITED STATES PATENT OFFICE
CERTIFICATE OF CORRECTION

Patent No. 3,531,491　　　　　　　　Dated September 29, 1970

Inventor(s)　　　Masateru Miyano

It is certified that error appears in the above-identified patent and that said Letters Patent are hereby corrected as shown below:

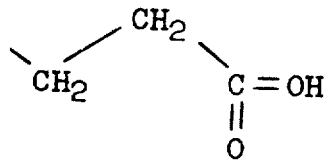　　　should be　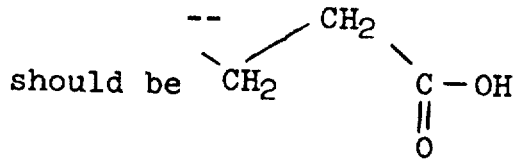

Column 7, lines 39-40, "of the formula when A is carbonyl" should be -- of the formula

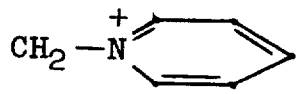

when A is carbonyl. --.

Column 8, line 8, "radical of the formula." should be -- radical of the formula

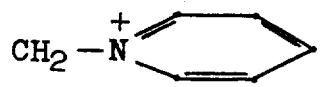

 --.

SIGNED AND
SEALED
DEC 8 1970

(SEAL)
Attest:

Edward M. Fletcher, Jr.
Attesting Officer

WILLIAM E. SCHUYLER, JR.
Commissioner of Patents